United States Patent
Su et al.

(10) Patent No.: US 10,061,768 B2
(45) Date of Patent: Aug. 28, 2018

(54) METHOD AND APPARATUS FOR IMPROVING A BILINGUAL CORPUS, MACHINE TRANSLATION METHOD AND APPARATUS

(71) Applicant: KABUSHIKI KAISHA TOSHIBA, Minato-ku, Tokyo (JP)

(72) Inventors: Tao Su, Beijing (CN); Dakun Zhang, Beijing (CN); Jie Hao, Beijing (CN)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 156 days.

(21) Appl. No.: 14/581,855

(22) Filed: Dec. 23, 2014

(65) Prior Publication Data

US 2015/0186361 A1    Jul. 2, 2015

(30) Foreign Application Priority Data

Dec. 25, 2013 (CN) ............. 2013 1 0728270

(51) Int. Cl.
  *G06F 17/28* (2006.01)
  *G06F 17/27* (2006.01)
(52) U.S. Cl.
  CPC ............... *G06F 17/2827* (2013.01)
(58) Field of Classification Search
  CPC .................................. G06F 17/2827
  USPC ......................................... 704/2
  See application file for complete search history.

(56) References Cited

U.S. PATENT DOCUMENTS

| 4,868,750 A | * | 9/1989 | Kucera | G06F 17/2775 |
| | | | | 704/8 |
| 6,288,656 B1 | * | 9/2001 | Desai | H04L 25/14 |
| | | | | 341/100 |
| 8,108,203 B2 | * | 1/2012 | Takano | G06F 17/2795 |
| | | | | 704/2 |

(Continued)

FOREIGN PATENT DOCUMENTS

| CN | 101271451 A | | 9/2008 | |
| CN | 101667177 A | * | 3/2010 | ......... G06F 17/2827 |

(Continued)

OTHER PUBLICATIONS

Doi et al, "Splitting Input Sentence for Machine Translation Using Language Model with Sentence Similarity," Proceedings of the 20th International Conference on Computational Linguistics, 2004, Article No. 113.*

(Continued)

*Primary Examiner* — Lamont M Spooner
*Assistant Examiner* — Oluwadamilola M Ogunbiyi
(74) *Attorney, Agent, or Firm* — Holtz, Holtz & Volek PC

(57) ABSTRACT

According to one aspect, there is provided an apparatus for improving a bilingual corpus including a plurality of sentence pairs of a first language and a second language and word alignment information of each of the sentence pairs, the apparatus comprises: an extracting unit for extracting a split candidate from word alignment information of a given sentence pair; a calculating unit for calculating split confidence of said split candidate; a comparing unit for comparing said split confidence and a pre-set threshold; and a splitting unit for splitting said given sentence pair at said split candidate in a case that said split confidence is larger than said pre-set threshold.

4 Claims, 6 Drawing Sheets

(56) References Cited

U.S. PATENT DOCUMENTS

| | | | |
|---|---|---|---|
| 8,788,258 B1* | 7/2014 | Bangalore | G11B 27/105 704/2 |
| 8,825,466 B1* | 9/2014 | Wang | G06F 17/2827 704/10 |
| 8,935,149 B2* | 1/2015 | Zhang | G06F 17/2827 704/2 |
| 2004/0044530 A1* | 3/2004 | Moore | G06F 17/2827 704/254 |
| 2007/0271088 A1* | 11/2007 | Waibel | G06F 17/275 704/9 |
| 2008/0249764 A1* | 10/2008 | Huang | G06F 17/2785 704/9 |
| 2008/0262829 A1* | 10/2008 | Liu | G06F 17/2229 704/4 |
| 2010/0174524 A1* | 7/2010 | Koehn | G06F 17/2818 704/4 |
| 2011/0202330 A1* | 8/2011 | Dai | G06F 17/2755 704/2 |
| 2011/0246173 A1* | 10/2011 | Li | G06F 17/2827 704/2 |
| 2012/0232882 A1* | 9/2012 | Zhang | G06F 17/2827 704/2 |
| 2013/0325442 A1* | 12/2013 | Dahlmeier | G06F 17/276 704/9 |
| 2014/0309986 A1* | 10/2014 | El-Sharqwi | G06F 17/2755 704/9 |
| 2014/0358519 A1* | 12/2014 | Mirkin | G06F 17/2854 704/3 |

FOREIGN PATENT DOCUMENTS

| | | |
|---|---|---|
| CN | 101996166 A | 3/2011 |
| CN | 102859515 A | 1/2013 |
| CN | 103324607 A | 9/2013 |

OTHER PUBLICATIONS

El-Kahlout et al, "The Pay-offs of Preprocessing for German-English Statistical Machine Translation," The International Workshop on Spoken Language Translation, 2010, pp. 251-258.*

Zhu et al, "A Monolingual Tree-based Translation Model for Sentence Simplification," Proceedings of the 23rd International Conference on Computational Linguistics, 2010, pp. 1352-1361.*

Xu, Jia et al, "Sentence Segmentation Using IBM Word Alignment Model 1" Proceedings of European Association for Machine Translation, 2005.*

Simard et al, "Using Cognates to Align Sentences in Bilingual Corpora," Proceedings of the 1993 Conference of the Centre for Advanced Studies on Collaborative Research: Distributed Computing, 1993, pp. 1071-1082.*

Ma et al, "Bootstrapping Word Alignment via Word Packing," Proceedings of the 45th Annual Meeting of the Association of Computational Linguistics. 2007, pp. 304-311.*

Chinese Office Action (and English translation thereof) dated Jul. 4, 2017 issued in counterpart Chinese Application No. 201310728270.X.

* cited by examiner

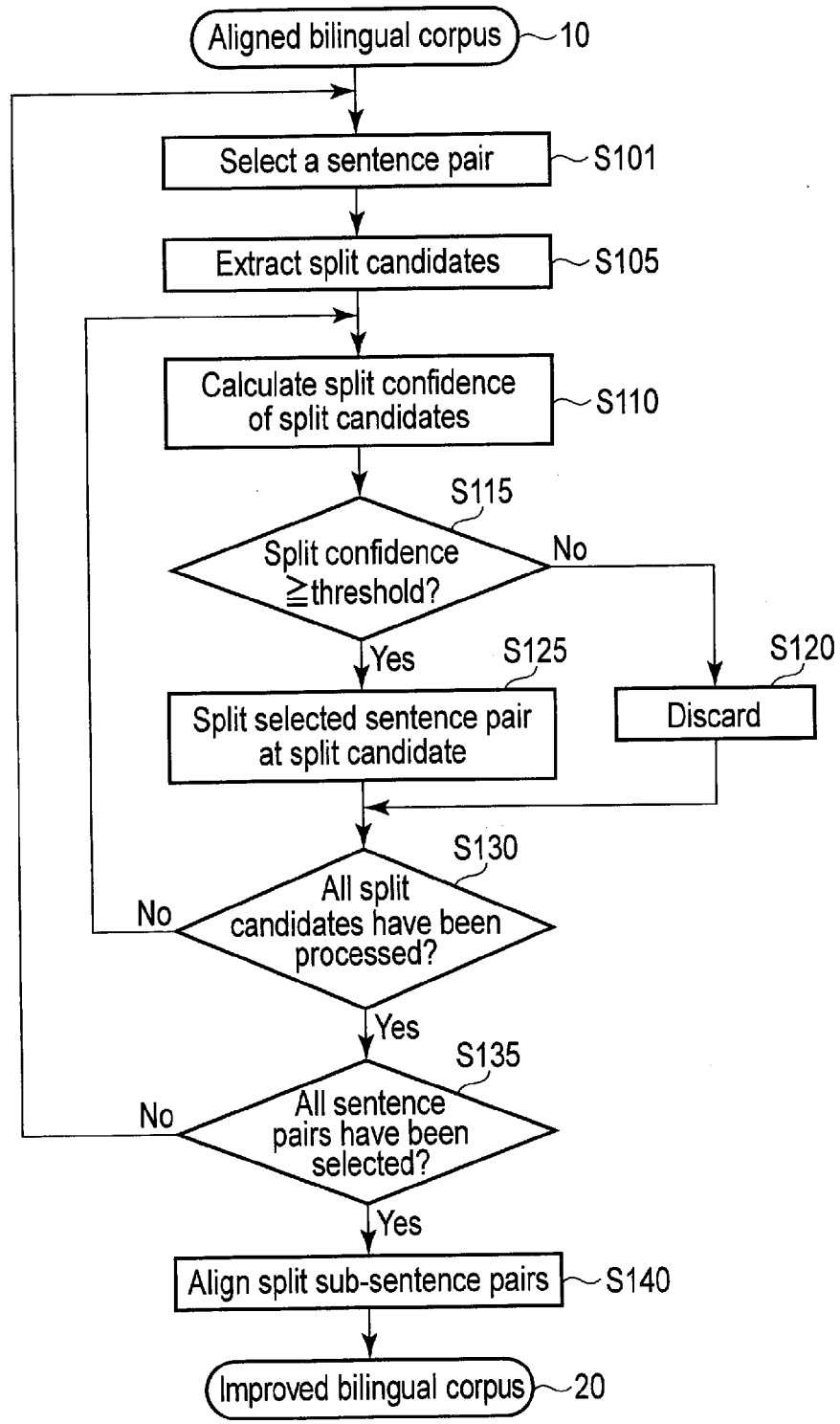
F I G. 1

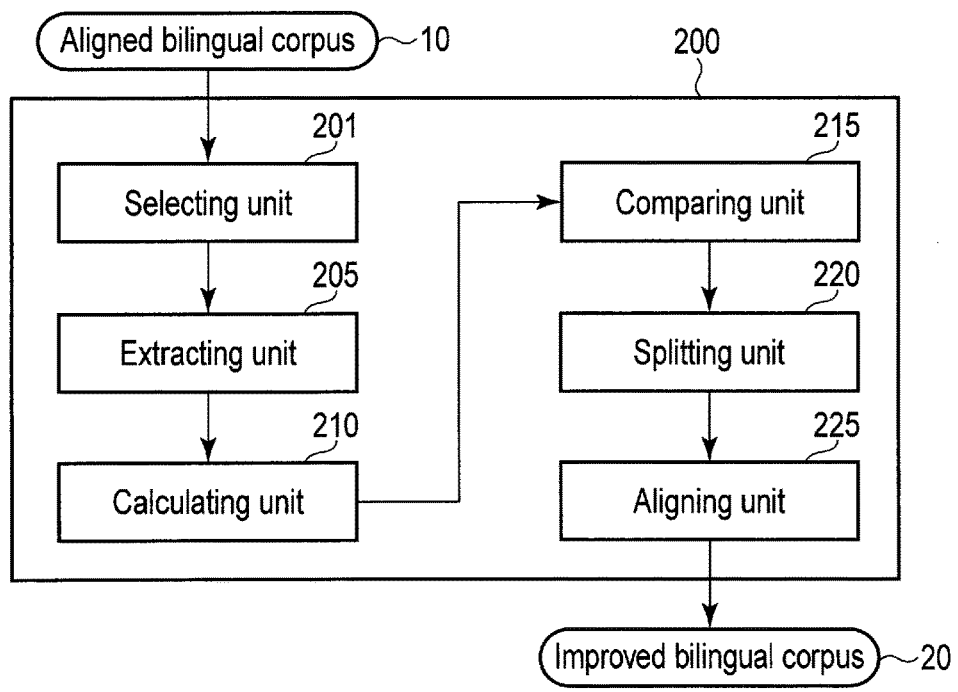
F I G. 2

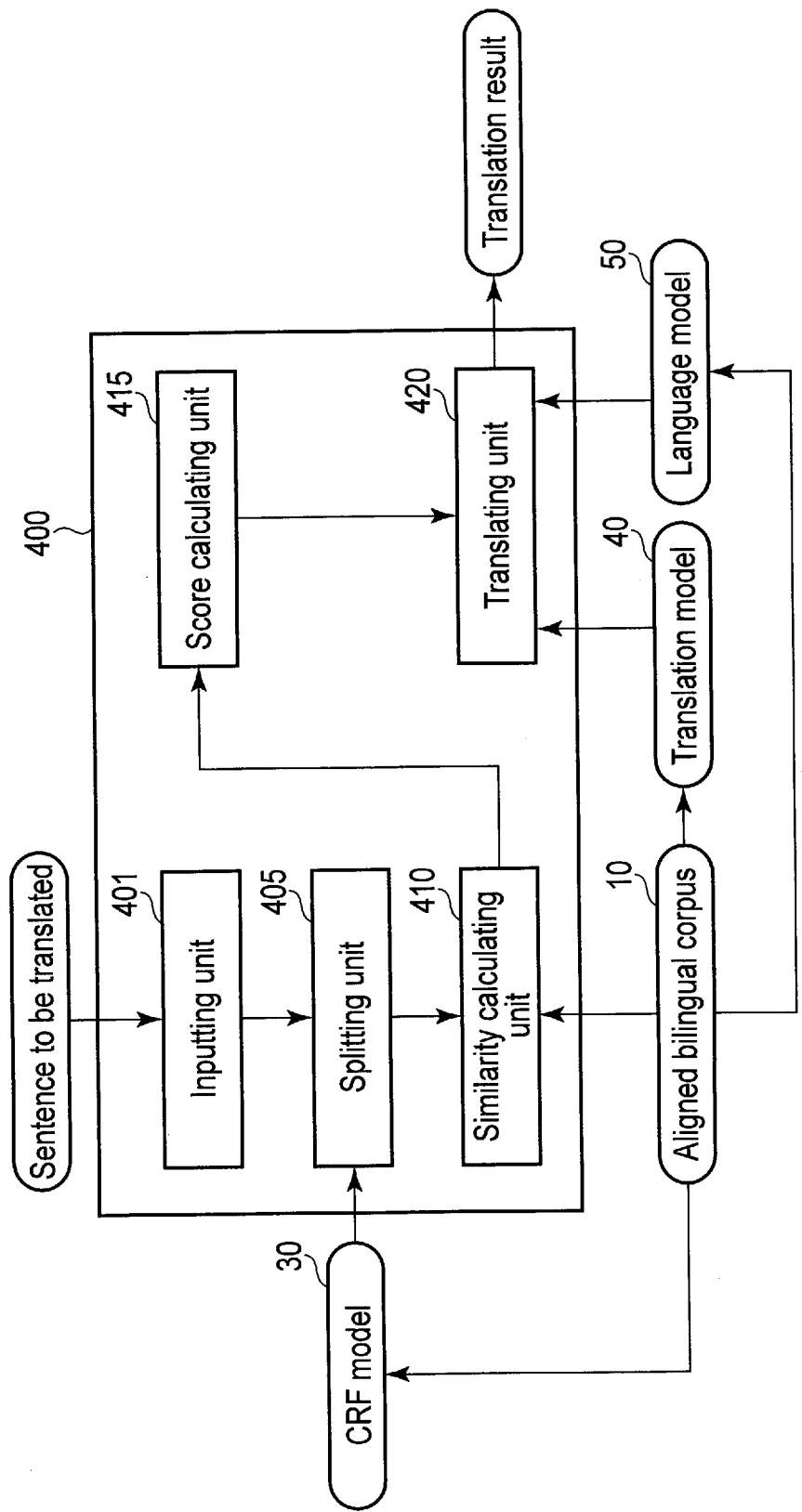
F I G. 4

METHOD AND APPARATUS FOR IMPROVING A BILINGUAL CORPUS, MACHINE TRANSLATION METHOD AND APPARATUS

CROSS-REFERENCE TO RELATED APPLICATIONS

This application is based upon and claims the benefit of priority from Chinese Patent Application No. 201310728270.X, filed Dec. 25, 2013, the entire contents of which are incorporated herein by reference.

FIELD

Embodiments described herein relate to a technique of natural language processing, specifically, to a method for improving a bilingual corpus, an apparatus for improving a bilingual corpus, a machine translation method and a machine translation apparatus.

BACKGROUND

Translation of a long sentence has been a severe problem in Statistical Machine Translation (SMT). A SMT system always fails to give a correct translation result when a sentence is too long, sometimes even fails to deal with it.

To avoid the difficulty in translating a long sentence, people always split a long sentence into shorter sub-sentences and then deal with the shorter sub-sentences. Previous research had proved that this is an effective method. Better performance could be achieved by just simply splicing the translation results for each of the sub-sentences after splitting in turn, especially for spoken language sentences which tend to have simple structures.

To split an input long sentence, the first problem needs to be solved is to define reasonable splitting criteria, that is, define the right splitting positions. A corpus-based SMT system includes a large-scale parallel bilingual corpus for data model training. The source side corpus of the bilingual corpus can be used for training and learning the splitting positions. But there usually exist a number of long bilingual sentence pairs in corpus, which will cause following problems: first, sentences of source side that are too long cannot provide sufficient information for splitting; next, bilingual sentence pairs that are too long usually cause more word alignment errors which are harm to translation quality directly.

In general, punctuation characters can provide useful splitting information. However, it's difficult to obtain satisfactory results by use of punctuations directly or just complement with simple manually formulated rules. Moreover, because of the difference of syntactic system between different languages, splitting from the point of view of monolingual side alone may cause that translation results of sub-sentences are no longer relative independent sentences, or cause change in word order. Therefore, we need to split the parallel corpus from the point of view of bilingual sides.

After acquiring proper training corpus, another problem needs to be solved is how to split long input sentences into a plurality of sub-sentences. Splitting a long sentence can be looked as a sequence labeling task, i.e. label each word in word sequence of a long sentence, its labeled value is one from a given label set, and then, splitting is performed according the labeling results.

In summary, the following two problems need to be solved to improve translation quality of long input sentences in a SMT system:

(1) How to split parallel bilingual corpus in training phase;

(2) How to split long input sentences in decoding phase.

As to the first problem "splitting parallel bilingual corpus in training phase", in previous research, "modified IBM-1 translation model" has been utilized to find an optimal splitting point in a bilingual sentence pair and split it into two parts; then, this method is done recursively over the split sub-sentence pair until length of each new sub-sentence is smaller than a pre-set threshold. However, this splitting method is relatively complicated.

Besides that, in previous research, the result of automatic word alignment has also been utilized to split a bilingual sentence pair. It looks for an optimal splitting point of a bilingual sentence pair at punctuations in accordance with some rules of thumb, and splits the bilingual sentence pair into two short sub-sentence pairs according to the optimal splitting point. Then, the above resulting sub-sentence pairs are split again recursively until there is no splitting point. This splitting method took into account the influence of alignment errors roughly. It aims at shortening the sentence length to decrease search space of parser tree corresponding to the sentence, but not improve the quality of word alignment.

As to the second problem "splitting long input sentences in decoding phase", one of the solutions commonly used is to utilize an N-gram language model based on Hidden Markov Model (HMM). For example, the command "hidden-ngram" integrated in SRILM toolkit, i.e., hidden events occurring between words is utilized to label word sequence by use of N-gram model (here, the hidden events refer to 'boundary' and 'no-boundary'). In particular, with respect to the problem of splitting a long sentence, it is to conduct sentence boundary labeling over each word in the long sentence, calculate probability score according to the N-gram language model, find out the most probable combination containing given word sequence and label sequence, and split according to the label results.

However, the most significant shortcoming of HMM is that it is based on assumption of output independence, which causes HMM fail to take into account context information.

BRIEF DESCRIPTION OF THE DRAWINGS

The above features, advantages and objectives of the embodiment will be better understood through the following description of the implementations of the embodiment in conjunction with the accompany drawings, in which:

FIG. 1 is a flowchart of a method for improving a bilingual corpus according to an embodiment.

FIG. 2 is a block diagram of an apparatus for improving a bilingual corpus according to another embodiment.

FIG. 4 is a block diagram of a machine translation apparatus according to another embodiment.

DETAILED DESCRIPTION

Figure 3:
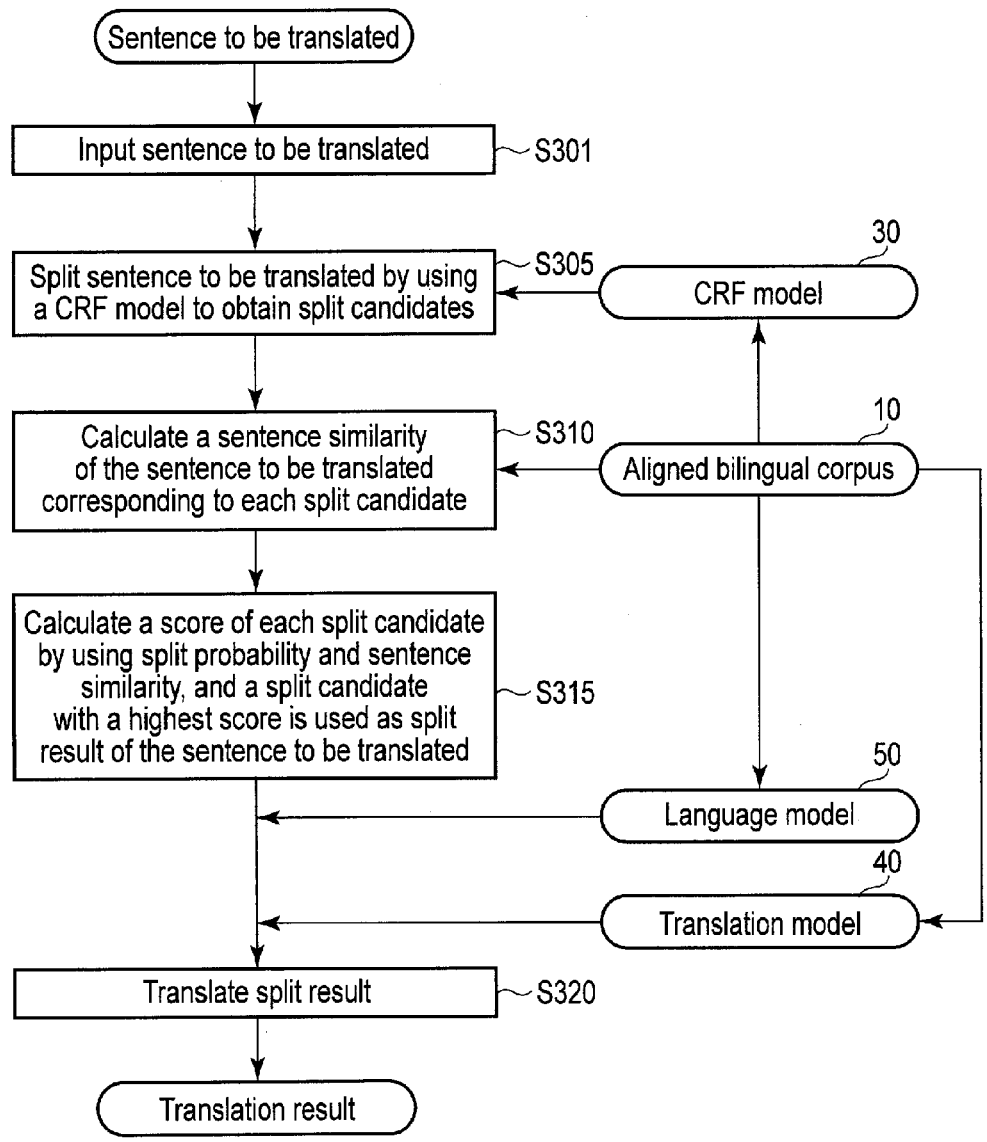
FIG. 3 is a flowchart of a machine translation method according to another embodiment.

In order to improve the problem in the art that the method for splitting bilingual corpus is complicated and there is no improvement in word alignment quality during training phase, the present embodiment has set forth a novel splitting algorithm. The algorithm first presents a concept of measurable Split Confidence (SC), calculates split confidence of each split candidate and compares it with a pre-set threshold, conducts splitting at candidate exceeding the threshold, and splits a long bilingual sentence pair into multiple shorter sub-sentence pairs simultaneously.

In addition, in order to improve the problem in the art that context information is not taken into account when splitting a long sentence during decoding phase, the present embodiment has set forth that, long sentences are split into shorter relatively independent sub-sentences that are more easily translated and appreciated by using a Conditional Random Fields (CRF) model in conjunction with sentence similarity. The CRF model can conveniently introduce more context features, and has shown distinct advantage over HMM in addressing sequence labeling tasks such as word segmentation, named entity recognition, etc. Meanwhile, information of the CRF model may be complemented by sentence similarity.

In summary, embodiments provide a method for improving a bilingual corpus, an apparatus for improving a bilingual corpus, a machine translation method and a machine translation apparatus. Specifically, the following technical solutions have been provided.

[1] An apparatus for improving a bilingual corpus including a plurality of sentence pairs of a first language and a second language and word alignment information of each of the sentence pairs, the apparatus comprising:

an extracting unit for extracting a split candidate from word alignment information of a given sentence pair;

a calculating unit for calculating split confidence of said split candidate;

a comparing unit for comparing said split confidence and a pre-set threshold; and a splitting unit for splitting said given sentence pair at said split candidate in a case that said split confidence is larger than said pre-set threshold.

The apparatus of the present embodiment for improving a bilingual corpus has taken into account corresponding translation results when choosing splitting positions, has avoided some word alignment errors between long distance words after splitting, it improves word alignment quality, thereby improves translation performance. Meanwhile, source side corpus after splitting provides more sufficient splitting position information, which may be used as training corpus for long input sentence splitting tasks during subsequent decoding phase. Such automatic splitting method may be conveniently extended to bilingual parallel corpus of other languages.

[2] The apparatus for improving a bilingual corpus according to [1], wherein a word of said first language and a word of said second language corresponding to said split candidate are one-to-one aligned.

[3] The apparatus for improving a bilingual corpus according to [1] or [2], wherein a word of said first language and a word of said second language corresponding to said split candidate are words and/or characters having sentence segmentation capability.

[4] The apparatus for improving a bilingual corpus according to any one of [1]-[3], wherein said calculating unit calculates said split confidence by using number of word alignments across said split candidate and length of said given sentence pair.

[5] The apparatus for improving a bilingual corpus according to [4], wherein said calculating unit calculates said split confidence by using a formula as below, $$sc_{a_j} = 1 - \frac{\text{cross}_{a_j}}{\text{sent\_len}}, \text{sent\_len} = (m+l)/2$$

wherein $a_j$ is said split candidate, $sc_{a_j}$ is said split confidence, $\text{cross}_{a_j}$ number of word alignments across said split candidate, sent_len is length of said given sentence pair, m is length of the sentence of said first language of said given sentence pair, and l is length of the sentence of said second language of said given sentence pair.

[6] The apparatus for improving a bilingual corpus according to any one of [1]-[5], further comprising:

an aligning unit for re-aligning words of sub-sentence pairs split by said splitting unit.

The apparatus of the present embodiment for improving a bilingual corpus re-aligns words of split sub-sentence pairs. Since word alignment is limited within sub-sentence pair, some incorrect long distance word alignments that may occur in original bilingual sentence pairs are avoided, it thus efficiently improves word alignment quality, thereby improves translation performance.

[7] A machine translation apparatus comprising:

a splitting unit for splitting a sentence to be translated by using a CRF model to obtain a plurality of split candidates, wherein each split candidate has a split probability;

a similarity calculating unit for calculating a sentence similarity of said sentence to be translated corresponding to said each split candidate;

a score calculating unit for calculating a score of said each split candidate by using said split probability and said sentence similarity, wherein a split candidate with a highest score is used as a split result of said sentence to be translated; and a translating unit for translating said split result by using translation knowledge learned from a bilingual corpus.

The machine translation apparatus of the present embodiment, by splitting long sentences using a CRF model in conjunction with sentence similarity, can not only introduce more features with the CRF model, but also complement information of the CRF model with sentence similarity, such that long sentences can be accurately split into shorter relatively independent sub-sentences that are more easily translated and understood, thereby improves translation performance.

[8] The machine translation apparatus according to [7], wherein said bilingual corpus is a bilingual corpus improved by the apparatus for improving a bilingual corpus according to any one of [1]-[6].

The machine translation apparatus of the present embodiment, by conducting translation using translation knowledge learned from an improved bilingual corpus, further improves translation performance.

[9] The machine translation apparatus according to [7] or [8], wherein said score calculating unit calculates a weighted average of said split probability and said sentence similarity, wherein said weighted average is used as said score.

[10] The machine translation apparatus according to any one of [7]-[9], wherein said similarity calculating unit:

calculates a sub-sentence similarity of each sub-sentence of said sentence to be translated against sentences of a first language of said bilingual corpus; and calculates a weighted average of sub-sentence similarities of said sub-sentences by using a ratio of length of said sub-sentence to length of said sentence to be translated as weight, wherein said weighted average is used as said sentence similarity.

[11] A method for improving a bilingual corpus including a plurality of sentence pairs of a first language and a second language and word alignment information of each of the sentence pairs, the method comprising steps of:

extracting a split candidate from word alignment information of a given sentence pair;

calculating split confidence of said split candidate;

comparing said split confidence and a pre-set threshold; and splitting said given sentence pair at said split candidate in a case that said split confidence is larger than said pre-set threshold.

The method of the present embodiment for improving a bilingual corpus has taken into account corresponding translation results when choosing splitting positions, has avoided some word alignment errors between long distance words after splitting, it improves word alignment quality, thereby improves translation performance. Meanwhile, source side corpus after splitting provides more sufficient splitting position information, which may be used as training corpus for long input sentence splitting tasks during subsequent decoding phase. Such automatic splitting method may be conveniently extended to bilingual parallel corpus of other languages.

[12] The method for improving a bilingual corpus according to [11], wherein a word of said first language and a word of said second language corresponding to said split candidate are one-to-one aligned.

[13] The method for improving a bilingual corpus according to [11] or [12], wherein a word of said first language and a word of said second language corresponding to said split candidate are words and/or characters having sentence segmentation capability.

[14] The method for improving a bilingual corpus according to any one of [11]-[13], wherein said calculating step comprises:

calculating said split confidence by using number of word alignments across said split candidate and length of said given sentence pair.

[15] The method for improving a bilingual corpus according to [14], wherein said calculating step comprises:

calculating said split confidence by using a formula as below, $$sc_{a_j} = 1 - \frac{cross_{a_j}}{sent\_len}, sent\_len = (m+l)/2$$

wherein is said split candidate, $sc_{a_j}$ is said split confidence, $cross_{a_j}$ is number of word alignments across said split candidate, sent_len is length of said given sentence pair, m is length of the sentence of said first language of said given sentence pair, and l is length of the sentence of said second language of said given sentence pair.

[16] The method for improving a bilingual corpus according to any one of [11]-[15], further comprising:

re-aligning words of sub-sentence pairs split by said splitting step.

The method of the present embodiment for improving a bilingual corpus re-aligns words of split sub-sentence pairs. Since word alignment is limited within sub-sentence pair, some incorrect long distance word alignments that may occur in original bilingual sentence pairs are avoided, it thus efficiently improves word alignment quality, thereby improves translation performance.

[17] A machine translation method comprising steps of:

splitting a sentence to be translated by using a CRF model to obtain a plurality of split candidates, wherein each split candidate has a split probability;

calculating a sentence similarity of said sentence to be translated corresponding to said each split candidate; calculating a score of said each split candidate by using said split probability and said sentence similarity, wherein a split candidate with a highest score is used as a split result of said sentence to be translated; and translating said split result by using translation knowledge learned from a bilingual corpus.

The machine translation method of the present embodiment, by splitting long sentences using a CRF model in conjunction with sentence similarity, can not only introduce more features with the CRF model, but also complement information of the CRF model with sentence similarity, such that long sentences can be accurately split into shorter relatively independent sub-sentences that are more easily translated and understood, thereby improves translation performance.

[18] The machine translation method according to [17], wherein said bilingual corpus is a bilingual corpus improved by the method for improving a bilingual corpus according to any one of [11]-[16].

The machine translation method of the present embodiment, by conducting translation using translation knowledge learned from an improved bilingual corpus, further improves translation performance.

[19] The machine translation method according to [17] or [18], wherein said step of calculating score comprises:

calculating a weighted average of said split probability and said sentence similarity, wherein said weighted average is used as said score.

[20] The machine translation method according to any one of [17]-[19], wherein said step of calculating sentence similarity comprises:

calculating a sub-sentence similarity of each sub-sentence of said sentence to be translated against sentences of a first language of said bilingual corpus; and calculating a weighted average of sub-sentence similarities of said sub-sentences by using a ratio of length of said sub-sentence to length of said sentence to be translated as weight, wherein said weighted average is used as said sentence similarity.

Detailed description of the preferred embodiments will be given in conjunction with the drawings.

Method for Improving a Bilingual Corpus

The present embodiment provides a method for improving a bilingual corpus including a plurality of sentence pairs of a first language and a second language and word alignment information of each of the sentence pairs, the method comprising steps of: extracting a split candidate from word alignment information of a given sentence pair; calculating split confidence of said split candidate; comparing said split confidence and a pre-set threshold; and splitting said given sentence pair at said split candidate in a case that said split confidence is larger than said pre-set threshold.

Detailed description will be given below with reference to FIG. 1, which is a flowchart of a method for improving a bilingual corpus according to the present embodiment.

As shown in FIG. 1, first, at step S101, a bilingual sentence pair is selected from an aligned bilingual corpus 10 to be improved. In the present embodiment, the aligned bilingual corpus 10 comprises a plurality of sentence pairs of a first language (source language) and a second language (target language) and word alignment information between each sentence pair given by an automatic word alignment tool. The aligned bilingual corpus 10 includes word alignment results obtained by aligning bilingual corpus with any word alignment tool known to those skilled in the art, such as GIZA++. The bilingual corpus is any bilingual corpus used for a SMT system known to those skilled in the art. The present embodiment has no limitation on the aligned bilingual corpus 10.

Next, at step S105, for the selected bilingual sentence pair, split candidates are extracted from its word alignment information. The specific process is shown as follows.

Assume that in the bilingual sentence pair, source language sentence is $c=c_1^m=(c_1, \ldots, c_m)$ and target language sentence is $e=e_1^l=(e_1, \ldots, e_l)$. m and l are natural number.

Bi-direction word alignment result obtained by GIZA++:

$$a=a_1^n=(a_1, \ldots, a_n), a_j=<s_j,t_j>, s_j \in [0,1,\ldots,m], t_j \in [0,1,\ldots,l]$$

In step S105, possible split candidates $a_j=<s_j,t_j>$ are extracted. In the present embodiment, split candidates preferably satisfy the following conditions:

(1) $c_{s_j}$ and $e_{t_j}$ are one-to-one aligned,
(2) $c_{s_j}$ and $e_{t_j}$ are words and/or characters having sentence segmentation capability.

Characters having sentence segmentation capability are preferably punctuation characters, which preferably are, but not limited to, period, comma, semicolon, question mark and exclamation mark, etc.

Next, at step S110, split confidence of split candidates $a_j=<s_j,t_j>$ is calculated. Preferably, the above split confidence is calculated by using number of word alignments across the split candidate and length of the selected bilingual sentence pair.

Specifically, the above split confidence is calculated by using a formula (1) below:

$$sc_{a_j} = 1 - \frac{cross_{a_j}}{sent\_len}, sent\_len = (m+1)/2 \quad (1)$$

wherein $a_j$ is split candidate, $sc_{a_j}$ is split confidence, $cross_{a_j}$ is number of word alignments across the split candidate, sent_len is length of the selected bilingual sentence pair, m is length of the sentence of source language of the selected bilingual sentence pair, and l is length of the sentence of target language of the selected bilingual sentence pair.

Next, calculation of split confidence will be explained through a specific example.

Figure 5:
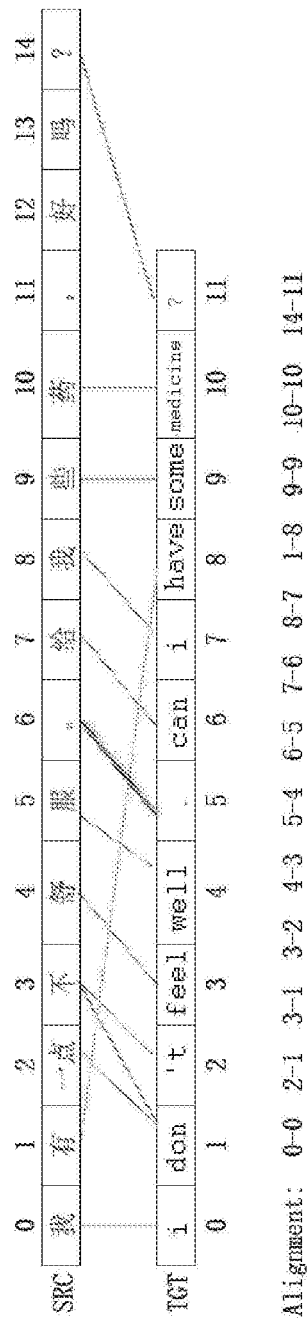
FIG. 5 shows a bi-direction word alignment result for a Chinese-English sentence pair.

For example, for a following Chinese-English sentence pair, bi-direction word alignment result given by GIZA++ tool as shown in FIG. 5.

First: extract a possible split candidate, that is, <6,5>;
Second: calculate split confidence by using formula (1)

$$sc_{<6,5>} = 1 - \frac{1}{(15+12)/2} = 0.926$$

Next, at step S115, it is judged whether the split confidence is greater than a pre-set threshold. In the present embodiment, the threshold is used to control number and quality of splitting. Based on experience, the threshold is preferably set to 0.9, that is, within a sub-sentence with ten words, at most one word is allowed to across the split candidate and align to a word of other sub-sentence beyond sub-sentence pair. It is appreciated that, the threshold may also be set to be smaller than or greater than 0.9 as needed.

At step S115, if split confidence $sc_{a_j}$ is smaller than the threshold, then proceeds to step S120, where the split candidate is discarded, then proceeds to step S130.

On the contrary, at step S115, if split confidence $sc_{a_j}$ is greater than or equal to the threshold, then proceeds to step S125, where the bilingual sentence pair is split at position $s_j$ of source language sentence and position $t_j$ of target language sentence, respectively.

For the above example, if the threshold is set to 0.9, since split confidence $sc_{<6,5>}$ is greater than 0.9, it is determined that sentences of source language and target language are split at <6,5> respectively, that is, the original sentence is split into the following two sub-sentence pairs:

我 有 一点 不 舒 服.—i don't feel well.

给 我 些 药, 好 吗?—can I have some medicine ?

Next, at step S130, it is judged whether all split candidates have been processed. If there is remaining split candidate to be processed, the process returns to step S110 to calculate split confidence for split candidate that has not been processed. If all the split candidates are processed, the process proceeds to step S135.

It is appreciated that, the order of step S125 and step S130 may be exchanged. That is to say, the steps may be performed as above, or the splitting may be performed after selecting all the split candidates whose split confidence is greater than or equal to the threshold.

At step S135, it is judged whether all the bilingual sentence pairs in the aligned bilingual corpus 10 have been selected. If there is remaining bilingual sentence pair to be processed, the process returns to step S101 to continue to perform process. Otherwise, the process proceeds to step S140.

At step S140, word alignment is conducted on the split sub-sentence pairs. In the present embodiment, word alignment may be conducted by using GIZA++ tool, or by using any other word alignment tools known to those skilled in the art.

Figure 6:
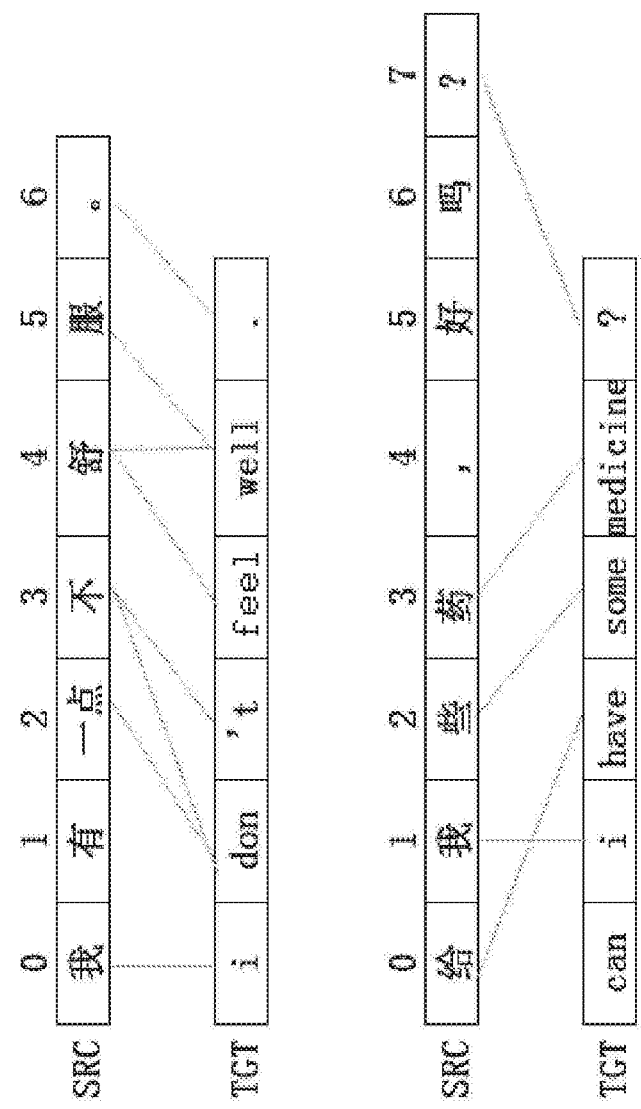
FIG. 6 shows a bi-direction word alignment result for a different example.

For the above example, the alignment result is as shown in FIG. 6.

The method of the present embodiment for improving a bilingual corpus avoids some word alignment errors between long distance words by splitting bilingual sentence pairs, and then re-aligns words in the split corpus. Since word alignment is limited within sub-sentence pair, some incorrect long distance word alignments that may occur in original bilingual sentence pairs are avoided, it thus efficiently improves word alignment quality, thereby improves translation performance. Meanwhile, source side corpus after splitting provides more sufficient splitting position information, which may be used as training corpus for long input sentence splitting tasks during subsequent decoding phase. Such automatic splitting method may be conveniently extended to bilingual parallel corpus of other languages.

Apparatus for Improving a Bilingual Corpus

Under a same inventive conception, FIG. 2 is a block diagram of an apparatus for improving a bilingual corpus according to another embodiment. The embodiment will be described below in conjunction with this figure. For those same parts as the foregoing embodiments, description of which will be properly omitted.

The present embodiment provides an apparatus for improving a bilingual corpus including a plurality of sentence pairs of a first language and a second language and word alignment information of each of the sentence pairs. The apparatus comprises: an extracting unit for extracting a split candidate from word alignment information of a given sentence pair; a calculating unit for calculating split confidence of said split candidate; a comparing unit for comparing said split confidence and a pre-set threshold; and a splitting unit for splitting said given sentence pair at said split candidate in a case that said split confidence is larger than said pre-set threshold.

Detailed description will be given below with reference to FIG. 2. As shown in FIG. 2, the apparatus 200 of the present embodiment for improving a bilingual corpus comprises: a selecting unit 201, an extracting unit 205, a calculating unit 210, a comparing unit 215, a splitting unit 220 and an aligning unit 225.

The selecting unit 201 selects a bilingual sentence pair from an aligned bilingual corpus 10 to be improved. In the present embodiment, the aligned bilingual corpus 10 comprises a plurality of sentence pairs of a first language (source language) and a second language (target language) and word alignment information between each sentence pair given by an automatic word alignment tool. The aligned bilingual corpus 10 includes word alignment results obtained by aligning bilingual corpus with any word alignment tool known to those skilled in the art, such as GIZA++. The bilingual corpus is any bilingual corpus used for a SMT system known to those skilled in the art. The present embodiment has no limitation on the aligned bilingual corpus 10.

The extracting unit 205 extracts, for the bilingual sentence pair selected by the selecting unit 201, split candidates from its word alignment information. The specific process is shown as follows.

Assume that in the bilingual sentence pair, source language sentence is $c=c_1^m=(c_1, \ldots, c_m)$, and target language sentence is $e=e_1^l=(e_1, \ldots, e_l)$. m and l are natural number.

Bi-direction word alignment result obtained by GIZA++:

$$a=a_1^n=(a_1, \ldots ,a_n), a_j=<s_j,t_j>, s_j \in [0,1, \ldots ,m], t_j \in [0,1, \ldots ,l]$$

The extracting unit 205 extracts possible split candidates $a_j=<s_j,t_j>$. In the present embodiment, split candidates preferably satisfy the following conditions:

(1) $c_{s_j}$ and $e_{t_j}$ are one-to-one aligned,
(2) $c_{s_j}$ and $e_{t_j}$ are words and/or characters having sentence segmentation capability.

Characters having sentence segmentation capability are preferably punctuation characters, which preferably are, but not limited to, period, comma, semicolon, question mark and exclamation mark, etc.

The calculating unit 210 calculates split confidence of split candidates $a_j=<s_j, t_j>$. Preferably, the above split confidence is calculated by using number of word alignments across the split candidate and length of the selected bilingual sentence pair.

Specifically, the calculating unit 210 calculates the above split confidence by using a formula (1) below:

$$sc_{a_j} = 1 - \frac{cross_{a_j}}{sent\_len}, \; sent\_len = (m+l)/2 \quad (1)$$

wherein $a_j$ is split candidate, $sc_{a_j}$ is split confidence, $cross_{a_j}$ is number of word alignments across the split candidate, sent_len is length of the selected bilingual sentence pair, m is length of the sentence of source language of the selected bilingual sentence pair, and l is length of the sentence of target language of the selected bilingual sentence pair.

For the above example, by using formula (1), the calculating unit 210 obtains split confidence:

$$sc_{<6,5>} = 1 - \frac{1}{(15+12)/2} = 0.926$$

The comparing unit 215 judges whether the split confidence is greater than a pre-set threshold. In the present embodiment, the threshold is used to control number and quality of splitting. Based on experience, the threshold is preferably set to 0.9, that is, within a sub-sentence with ten words, at most one word is allowed to across the split candidate and align to a word of other sub-sentence beyond sub-sentence pair. It is appreciated that, the threshold may also be set to be smaller than or greater than 0.9 as needed.

If split confidence $Sc_{a_j}$ is smaller than the threshold, the split candidate is discarded.

If split confidence $sc_{a_j}$ is greater than or equal to the threshold, the splitting unit 220 splits the bilingual sentence pair at position $s_j$ of source language sentence and position $t_j$ of target language sentence, respectively.

The splitting unit 220 may either conduct splitting after selecting a split candidate whose split confidence is greater than or equal to the threshold, or may conduct splitting after selecting all the split candidates whose split confidence is greater than or equal to the threshold.

The aligning unit 225 conducts word alignment on the split sub-sentence pairs. In the present embodiment, alignment may be conducted by using GIZA++ tool, or by using any other alignment tools known to those skilled in the art.

The apparatus 200 of the present embodiment for improving a bilingual corpus can process all the sentence pairs in the aligned bilingual corpus 10, thereby obtain an improved bilingual corpus 20.

The apparatus 200 of the present embodiment for improving a bilingual corpus avoids some word alignment errors between long distance words by splitting bilingual sentence pairs, and then re-aligns words in the split corpus. Since word alignment is limited within sub-sentence pair, some incorrect long distance word alignments that may occur in original bilingual sentence pairs are avoided, it thus efficiently improves word alignment quality, thereby improves translation performance. Meanwhile, source side corpus after splitting provides more sufficient splitting position information, which may be used as training corpus for long input sentence splitting tasks during subsequent decoding phase. Such automatic splitting method may be conveniently extended to bilingual parallel corpus of other languages.

Machine Translation Method

Under a same inventive conception, FIG. 3 is a flowchart of a machine translation method according to another embodiment. The embodiment will be described below in conjunction with this figure. For those same parts as the foregoing embodiments, description of which will be properly omitted.

The present embodiment provides a machine translation method comprising steps of: splitting a sentence to be translated by using a CRF model to obtain a plurality of split candidates, wherein each split candidate has a split probability; calculating a sentence similarity of said sentence to be translated corresponding to said each split candidate; calculating a score of said each split candidate by using said split probability and said sentence similarity, wherein a split candidate with a highest score is used as a split result of said sentence to be translated; and translating said split result by using translation knowledge learned from a bilingual corpus.

Detailed description will be given below with reference to FIG. 3. As shown in FIG. 3, at step S301, a sentence to be translated is inputted. In the present embodiment, the sentence to be translated may be a sentence in any language.

Next, at step S305, the sentence to be translated is split by using a CRF model 30 to obtain a plurality of split candidates, wherein each split candidate has a split probability.

The CRF model 30 is any CRF model known to those skilled in the art. Specifically, by using an open source CRF++ tool, the CRF model 30 is trained based on the tagged training corpus according to pre-defined feature templates.

A tag set (B, I, E) for tagging a training corpus is specifically defined as:

B: The beginning word of a sub-sentence;
I: The intermediate word of a sub-sentence;
E: The ending word of a sub-sentence.

For example: i/B don/I 't/I feel/I well/I ./E

At step S305, first, each word in the sentence to be translated is tagged, then, N-best split candidates are acquired by using the CRF model 30 according to the tagging result, and each split candidate is assigned a split probability.

Next, at step S310, a sentence similarity of the sentence to be translated corresponding to each split candidate is calculated. Specifically, corresponding to each split candidate, the sentence to be translated is split into a plurality of sub-sentences, first, a sub-sentence similarity of each sub-sentence against sentences of source language of the bilingual corpus is calculated, then, a weighted average of sub-sentence similarities of sub-sentences is calculated by using a ratio of length of the sub-sentence to length of the sentence to be translated as weight, the weighted average is used as the sentence similarity of the sentence to be translated corresponding to that split candidate.

Next, at step S315, a score of each split candidate is calculated by using the split probability and the sentence similarity, and a split candidate with a highest score is used as split result of the sentence to be translated. Preferably, a weighted average of the split probability and the sentence similarity is used as the score.

Specifically, the score is calculated according to the following formula (2) to select an optimal split candidate:

$$\text{Score}=\text{Prob}^{1-\lambda}\cdot\text{Sim}^{\lambda}, \lambda\in[0,1] \quad (2)$$

Wherein, Prob is split probability of CRF model of that split candidate, Sim is sentence similarity, and λ is weight.

Next, at step S320, the split result is translated by using translation knowledge such as translation model 40 and language model 50 trained based on bilingual corpus. In the present embodiment, the bilingual corpus for training translation knowledge may be any bilingual corpus known to those skilled in the art, or may be a bilingual corpus improved based on the method and apparatus of the above embodiments for improving a bilingual corpus. The translation model 40 and language model 50 acquired from training may be any model for machine translation known to those skilled in the art, and the embodiment has no limitation thereto.

The machine translation method of the present embodiment, by splitting long sentences using a CRF model in conjunction with sentence similarity, can not only introduce more features with the CRF model, but also complement information of the CRF model with sentence similarity, such that long sentences can be accurately split into shorter relatively independent sub-sentences that are more easily translated and understood, thereby improves translation performance.

The machine translation method of the present embodiment, by conducting translation using translation knowledge learned from an improved bilingual corpus, further improves translation performance.

Machine Translation Apparatus

Under a same inventive conception, FIG. 4 is a block diagram of a machine translation apparatus according to another embodiment. The embodiment will be described below in conjunction with this figure. For those same parts as the foregoing embodiments, description of which will be properly omitted.

The present embodiment provides a machine translation apparatus comprising: a splitting unit for splitting a sentence to be translated by using a CRF model to obtain a plurality of split candidates, wherein each split candidate has a split probability; a similarity calculating unit for calculating a sentence similarity of said sentence to be translated corresponding to said each split candidate; a score calculating unit for calculating a score of said each split candidate by using said split probability and said sentence similarity, wherein a split candidate with a highest score is used as a split result of said sentence to be translated; and a translating unit for translating said split result by using translation knowledge learned from a bilingual corpus.

Detailed description will be given below with reference to FIG. 4. As shown in FIG. 4, the machine translation apparatus of the present embodiment comprises: an inputting unit 401, a splitting unit 405, a similarity calculating unit 410, a score calculating unit 415 and a translating unit 420.

The inputting unit 401 inputs a sentence to be translated. In the present embodiment, the sentence to be translated may be a sentence in any language.

The splitting unit 405 splits the sentence to be translated by using a CRF model 30 to obtain a plurality of split candidates, wherein each split candidate has a split probability.

The CRF model 30 is any CRF model known to those skilled in the art. Specifically, by using an open source CRF++ tool, the CRF model 30 is trained based on the tagged training corpus according to pre-defined feature templates.

A tag set (B, I, E) for tagging a training corpus is specifically defined as:

B: The beginning word of a sub-sentence;
I: The intermediate word of a sub-sentence;
E: The ending word of a sub-sentence.

For example: i/B don/I 't/I feel/I well/I ./E

The splitting unit 405 first tags each word in the sentence to be translated, then, N-best split candidates are acquired by using the CRF model 30 according to the tagging result, and each split candidate is assigned a split probability.

The similarity calculating unit 410 calculates a sentence similarity of the sentence to be translated corresponding to each split candidate. Specifically, corresponding to each split candidate, the sentence to be translated is split into a plurality of sub-sentences, first, a sub-sentence similarity of each sub-sentence against sentences of source language of the bilingual corpus is calculated, then, a weighted average of sub-sentence similarities of sub-sentences is calculated by using a ratio of length of the sub-sentence to length of the sentence to be translated as weight, the weighted average is used as the sentence similarity of the sentence to be translated corresponding to that split candidate.

The score calculating unit 415 calculates a score of each split candidate by using the split probability and the sentence similarity, and a split candidate with a highest score is used as split result of the sentence to be translated. Preferably, a weighted average of the split probability and the sentence similarity is used as the score.

Specifically, the score is calculated according to the following formula (2) to select an optimal split candidate:

$$Score = Prob^{1-\lambda} \cdot Sim^{\lambda}, \lambda \in [0,1] \qquad (2)$$

Wherein, Prob is split probability of CRF model of that split candidate, Sim is sentence similarity, and λ is weight.

The translating unit 420 translates the split result by using translation knowledge such as translation model 40 and language model 50 trained based on bilingual corpus. In the present embodiment, the bilingual corpus for training translation knowledge may be any bilingual corpus known to those skilled in the art, or may be a bilingual corpus improved based on the method and apparatus of the above embodiments for improving a bilingual corpus. The translation model 40 and language model 50 acquired from training may be any model for machine translation known to those skilled in the art, and the embodiment has no limitation thereto.

The machine translation apparatus 400 of the present embodiment, by splitting long sentences using a CRF model in conjunction with sentence similarity, can not only introduce more features with the CRF model, but also complement information of the CRF model with sentence similarity, such that long sentences can be accurately split into shorter relatively independent sub-sentences that are more easily translated and understood, thereby improves translation performance.

The machine translation apparatus 400 of the present embodiment, by conducting translation using translation knowledge learned from an improved bilingual corpus, further improves translation performance.

Although a method for improving a bilingual corpus, an apparatus for improving a bilingual corpus, a machine translation method and a machine translation apparatus of the embodiment have been described in detail through some illustrative embodiments, these embodiments are not exhaustive, various changes and modifications may be made by those skilled in the art within spirit and scope of the invention. Therefore, the invention is not limited to these embodiments, the scope of which is only defined by accompany claims.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method performed by a machine translation apparatus which improves a bilingual corpus and which performs statistical machine translation based on the improved bilingual corpus, said bilingual corpus including a plurality of sentence pairs of a first language and a second language and word alignment information of each of the sentence pairs, the method comprising operating the machine translation apparatus to perform functions comprising:

extracting a split candidate for splitting a given sentence pair into a plurality of sub-sentence pairs, from word alignment information of the given sentence pair;

calculating a split confidence of said split candidate based on both of a number of word alignments across said split candidate and a length of said given sentence pair, wherein said split confidence is calculated such that as a ratio of said number of word alignments across said split candidate to said length of said given sentence pair decreases, said split confidence increases;

comparing said split confidence and a pre-set threshold;

splitting said given sentence pair at said split candidate in a case in which said split confidence is larger than said pre-set threshold;

re-aligning words of sub-sentence pairs split by said splitting to generate an improved bilingual corpus;

translating an input sentence from one of the first language and the second language to the other of the first language and the second language, based on translation knowledge trained based on the improved bilingual corpus; and outputting a result of the translating.

2. The method according to claim 1, wherein a word of said first language and a word of said second language corresponding to said split candidate are at least one of words and characters that are one-to-one aligned and that have sentence segmentation capability.

3. The method according to claim 1, wherein the bilingual sentence pair is split at a position of a source language sentence and a position of a target language sentence, respectively.

4. The method according to claim 1, wherein said split confidence is calculated by using a formula as below, $$sc_{a_j} = 1 - \frac{cross_{a_j}}{sent\_len}, \; sent\_len = (m+1)/2$$

wherein $a_j$ is said split candidate, $sc_{a_j}$ is said split confidence, $cross_{a_j}$ is said number of word alignments across said split candidate, sent_len is said length of said given sentence pair, m is a length of the sentence of said first language of said given sentence pair, and l is a length of the sentence of said second language of said given sentence pair.

* * * * *